(12) United States Patent  
Mirabella et al.

(10) Patent No.: US 8,567,840 B2
(45) Date of Patent: Oct. 29, 2013

(54) MOSAIC PANEL KIT AND METHOD

(76) Inventors: Peter M. Mirabella, Schererville, IN (US); Robert W. Haberkorn, Orland Park, IL (US)

(*) Notice: Subject to any disclaimer, the term of this patent is extended or adjusted under 35 U.S.C. 154(b) by 0 days.

(21) Appl. No.: 12/800,307

(22) Filed: May 13, 2010

(65) Prior Publication Data

US 2011/0316301 A1 Dec. 29, 2011

(51) Int. Cl.
*B60R 13/01* (2006.01)
(52) U.S. Cl.
USPC .................................................. 296/39.1
(58) Field of Classification Search
USPC ............... 296/39.1–39.3, 37.6, 186.1, 186.2, 296/186.4, 186.5; 105/423; 150/166; 160/370.1; 135/88.09
See application file for complete search history.

(56) References Cited

U.S. PATENT DOCUMENTS

| | | | | |
|---|---|---|---|---|
| 1,950,316 A * | 3/1934 | Lorenz | ............ | 105/423 |
| 3,142,265 A * | 7/1964 | Ford | ............ | 105/423 |
| 3,653,710 A * | 4/1972 | Barnard | ............ | 296/39.1 |
| 4,186,845 A * | 2/1980 | Podd | ............ | 383/66 |
| 4,420,183 A * | 12/1983 | Sherman | ............ | 296/39.1 |
| 4,453,875 A * | 6/1984 | Johnson, Sr. | ............ | 414/304 |
| 4,461,402 A * | 7/1984 | Fell et al. | ............ | 222/105 |
| 4,671,733 A * | 6/1987 | Krein | ............ | 414/809 |
| 4,674,127 A * | 6/1987 | Yamada et al. | ............ | 383/6 |
| 4,736,762 A * | 4/1988 | Wayman | ............ | 52/2.14 |
| 4,877,281 A * | 10/1989 | Altmann | ............ | 296/39.1 |
| 4,986,590 A * | 1/1991 | Patti et al. | ............ | 296/39.2 |
| 5,040,693 A * | 8/1991 | Podd et al. | ............ | 220/1.5 |
| 5,139,300 A * | 8/1992 | Carriere | ............ | 296/39.1 |
| 5,378,034 A * | 1/1995 | Nelsen | ............ | 296/39.2 |
| 5,506,020 A * | 4/1996 | Haberkorn | ............ | 428/102 |
| 5,570,921 A * | 11/1996 | Brooker | ............ | 296/39.1 |
| 5,597,193 A * | 1/1997 | Conner | ............ | 296/37.6 |
| 5,722,710 A * | 3/1998 | Falciani | ............ | 296/39.1 |
| 5,803,524 A * | 9/1998 | McCammon | ............ | 296/39.1 |
| 5,806,909 A * | 9/1998 | Wise | ............ | 296/39.1 |
| 5,927,785 A * | 7/1999 | Cantrell | ............ | 296/39.1 |
| 6,059,343 A * | 5/2000 | Emery | ............ | 296/39.2 |
| 6,120,078 A * | 9/2000 | Smyl | ............ | 296/39.1 |
| 6,131,983 A * | 10/2000 | Jackson | ............ | 296/39.2 |
| 6,135,531 A * | 10/2000 | Allen et al. | ............ | 296/39.1 |
| 6,142,550 A * | 11/2000 | Blyth et al. | ............ | 296/39.2 |
| 6,196,287 B1 * | 3/2001 | Haberkorn | ............ | 150/154 |
| 6,203,089 B1 * | 3/2001 | Doolittle et al. | ............ | 296/39.1 |
| 6,206,443 B1 * | 3/2001 | Konop et al. | ............ | 296/39.1 |
| 6,478,061 B2 * | 11/2002 | Haberkorn | ............ | 150/154 |
| 6,595,568 B1 * | 7/2003 | Schroeder et al. | ............ | 296/39.1 |
| 6,619,717 B2 * | 9/2003 | Gardiner | ............ | 296/39.2 |
| 6,729,671 B2 * | 5/2004 | Keles | ............ | 296/39.2 |
| 7,052,069 B2 * | 5/2006 | Vance et al. | ............ | 296/39.1 |
| 7,178,851 B1 * | 2/2007 | Gridley | ............ | 296/39.1 |
| 7,219,944 B2 * | 5/2007 | Klotz et al. | ............ | 296/39.1 |
| 7,597,373 B2 * | 10/2009 | McAuliffe, Jr. | ............ | 296/39.1 |
| 2003/0107230 A1 * | 6/2003 | Keles | ............ | 296/39.1 |

* cited by examiner

*Primary Examiner* — Glenn Dayoan
*Assistant Examiner* — Gregory Blankenship

(57) ABSTRACT

A mosaic panel kit (10) and method (200) is described. The method (200) can include: installing (202) wall panels (12) to an interior surface (14) of an enclosure (16) nose (18) and walls (20); interconnecting (204) each wall panel (12) with an adjacent wall panel; and providing (206) a ceiling panel (40) over cargo (42) to be protected. The kit (10) and method (200) provide a simple and effective way to protect temperature sensitive products and/or cargos, from ambient temperature fluctuations.

29 Claims, 12 Drawing Sheets

US 8,567,840 B2

MOSAIC PANEL KIT AND METHOD

FIELD OF THE INVENTION

The present invention relates generally to protecting temperature sensitive material, and more particularly, to a mosaic panel kit and method thereof for protecting temperature sensitive products and cargo, from ambient temperature fluctuations.

BACKGROUND OF THE INVENTION

Over the years various attempts have been made to protect temperature sensitive cargo during transportation. One way is to place the cargo in a refrigerated or heated container, which are commonly referred to as reefers, which is expensive proposition. There are many disadvantages with refers, such as reduced cargo capacity due to the refrigeration equipment, as about ten percent of the available volume is consumed by the refrigeration equipment, power and/or fuel costs, maintenance costs, failure costs, etc. Electric refers need a power connection. For extended oceanic shipments, there are limited parking spaces for refers, needing power and refueling. Also, the logistics industry commonly provides incentives for shipment of dry containers, such as every tenth shipment is free for dry containers. Thus shipping costs for refers can approach about twice as much as for dry or passive containers.

Passive methods have been attempted, which utilize or hang sidewall cargo quilt drapes on interior walls of containers, by Q-Sales and Leasing LLC. The typical length of such drapes was about 28 feet long and 8 feet wide, creating installation challenges and when not in use, such drapes are rolled up, causing transportation challenges. Installation of these drapes was labor intensive and often require at least two installers to manipulate the drapes, by locating them in a container, unrolling each drape, moving them vertically to drape from near the ceiling to the floor of a container, and adhering them to the interior walls. The drapes were adhered to the interior side walls by two-sided adhesive tape, Velcro or using the tape or Velcro to attach to container hooks, all of which take a lot of time. Also, the adhering structure had limitations, and thus drape kits needed to be replenished after each installation, as the adhesive components become dirty and loose their adhesive properties and the adhering structure was often damaged after removal.

Thus, there is a need to: provide an insulative panel kit and method that is easy to handle, transport and install; dimension and construct panels which are light weight and flexible to be managed by an installer for minimizing labor installation and maintenance costs; and provide enhanced ways to provide an enclosure with thermal protection for temperature sensitive materials or cargo.

There is also a need to provide a panel kit and method that provides an attachment structure integrated with the panel adapted to provide a simplified way to connect a panel to an interior of a container, such as by use of an appendage attached to the panel adapted for reuse and ease of installation and removal, and to provide a cost effective and passive thermal protection for temperature sensitive material storage or cargo.

There is also a need to provide a panel kit and method that is environmentally friendly which provides an attachment structure integrated with the panel, such as by use of an appendage with magnets or Velcro, which is adapted for reuse and ease of installation and removal, that minimizes or eliminates waste.

There is a need for an improved panel kit and method, to provide thermal protection for temperature sensitive cargo or material storage.

BRIEF DESCRIPTION OF THE DRAWINGS

In FIG. 8, corner pockets 97 are provided and are adapted to receive a head 100 of an applicator tool 98, in phantom, for facilitating alignment of a corner portion of a wall panel 12 with respect to the enclosure 16.

DETAILED DESCRIPTION OF THE DRAWINGS

Figure 1:
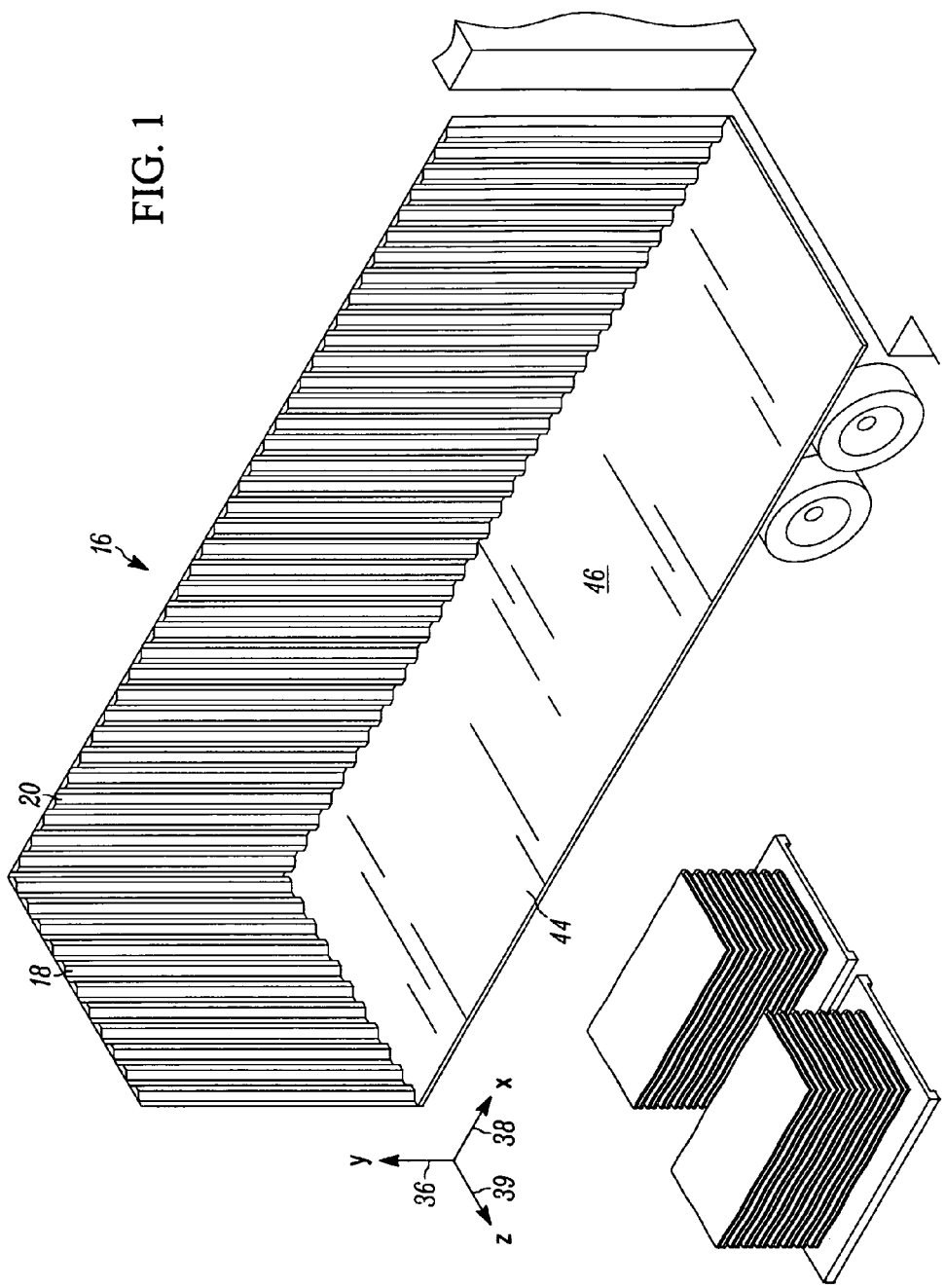
FIG. 1 is a simplified environmental cut-away view of an enclosure, in the form of a truck trailer, with two pallets of wall panels, adapted for use in connection with a mosaic panel kit and method.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Before describing in detail embodiments that are in accordance with the present invention, it should be observed that the present invention resides primarily in apparatus components and combinations of method steps related to the housing and integral user interface. Accordingly, the apparatus components and method steps have been represented where appropriate by conventional symbols in the drawings, showing only those specific details that are pertinent to understanding the present invention, so as not to obscure the disclosure with details that will be readily apparent to those of ordinary skill in the art, having the benefit of the description herein.

In this document, relational terms such as first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

A mosaic panel kit 10 is shown and described in the figures. The kit 10 can include: wall panels 12 configured to be installed to an interior surface 14 of an enclosure 16 nose (front wall or bow) 18 and walls 20; a plurality of appendages 22 spaced along a mid-section 24 and a top-section 26 of each wall panel 12 configured to adhere and connect to the interior surface 14 of the enclosure 16; interface borders 28, for interconnecting and over-lapping a first wall panel 30 adjacent to an interface border 32 of a second wall panel 34 along a vertical y-axis 36; and a ceiling panel 40 for blanketing cargo 42 to be protected. Advantageously, a simple, light weight and easy to install panel kit is provided, to protect temperature sensitive cargo or materials from ambient temperature fluctuations.

Figure 2:
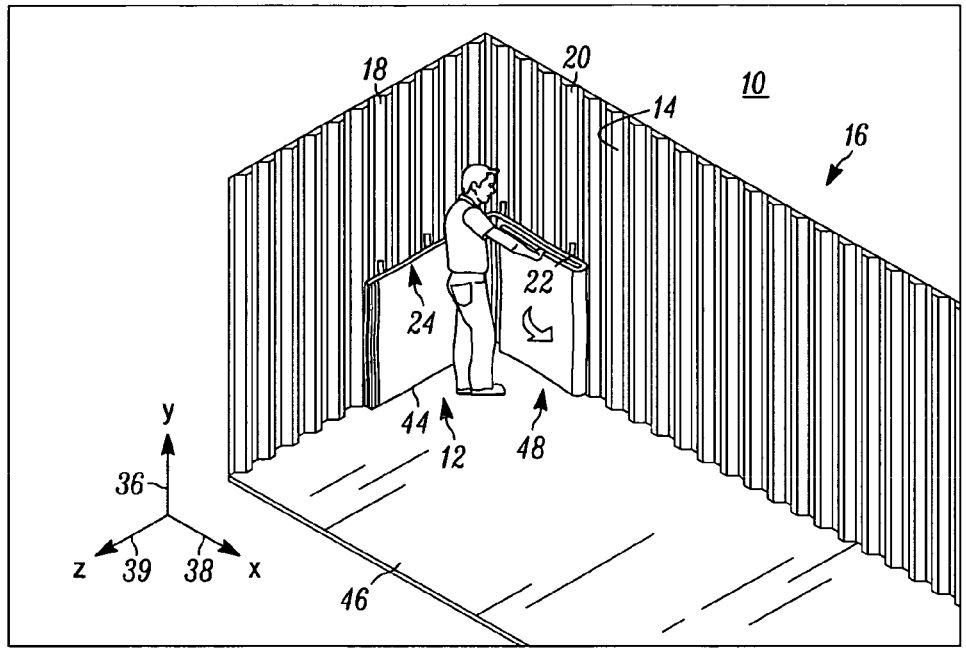
FIG. 2 is an exemplary partial view of an enclosure, showing an exemplary initial installing step including a wall panel 12, configured for ease of installation, shown: aligned (along a horizontal x-axis 38 and z-axis 39) at a bottom portion 44 with a floor 46 of the enclosure 16, an installer is shown in the process of unfolding 48 generally in a horizontal direction in an accordian-like manner (along an x-axis 38), and coupling and adhering the wall panel 12 to the interior surface 14 of the enclosure 16 via the plurality of appendages 22, in accordance with an embodiment of the invention.

FIG. 2 is an exemplary partial view of an enclosure, showing an exemplary initial installing step including a wall panel 12, configured for ease of installation, shown: aligned (along a horizontal x-axis 38 and z-axis 39) at a bottom portion 44 with a floor 46 of the enclosure 16, an installer is shown in the process of unfolding 48 generally in a horizontal direction in an accordion like manner (along an x-axis 38), and coupling and adhering the wall panel 12 to the interior surface 14 of the enclosure 16 via the plurality of appendages 22 This structure provides ease of alignment and simplified installation.

Figure 3:
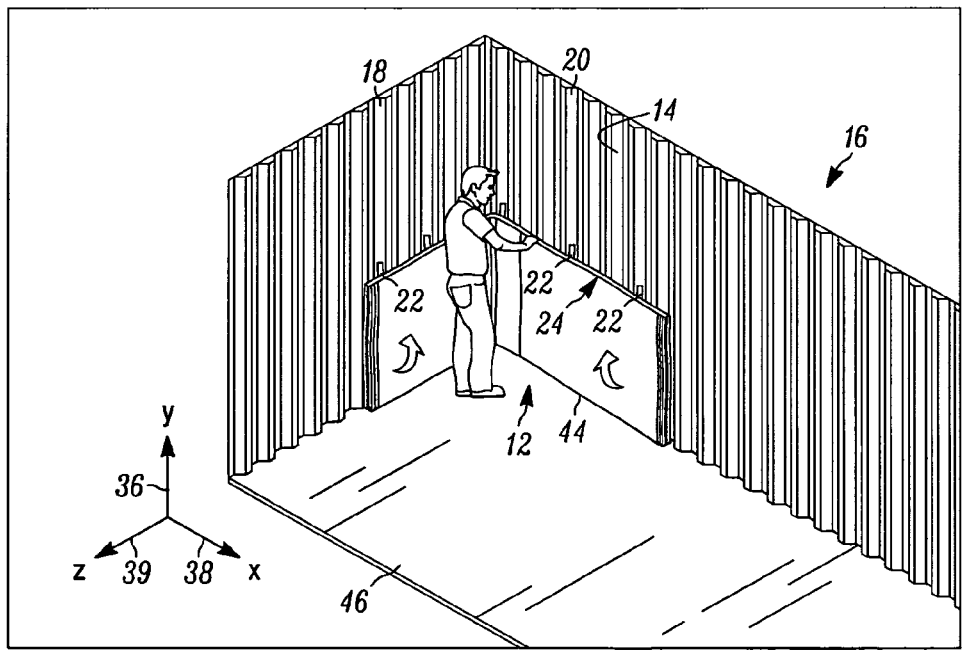
FIG. 3 is a continuation of the exemplary installing step in FIG. 2, showing a wall panel 12 with the appendages 22 providing adherence to the interior surface 14 of the enclosure 16 along the mid-section 24 of each wall panel 12. The enclosure 16 interior surface 14 walls are shown corrugated. The appendages 22 are shown configured to provide reliable connections to the interior surface 14, in accordance with an embodiment of the invention.

As shown in FIG. 3, the appendages 22 provide adherence to the interior surface 14 of the enclosure 16 along the mid-section 24 and top-section 26 of each wall panel 12. As shown in FIGS. 2 and 3, the enclosure 16 interior surface 14 walls can be corrugated. The appendages 22, in one important use case, are particularly configured to provide secure and reliable connections to the interior surface 14 of the enclosure 16, during installation and use in protecting cargo.

Figure 6:
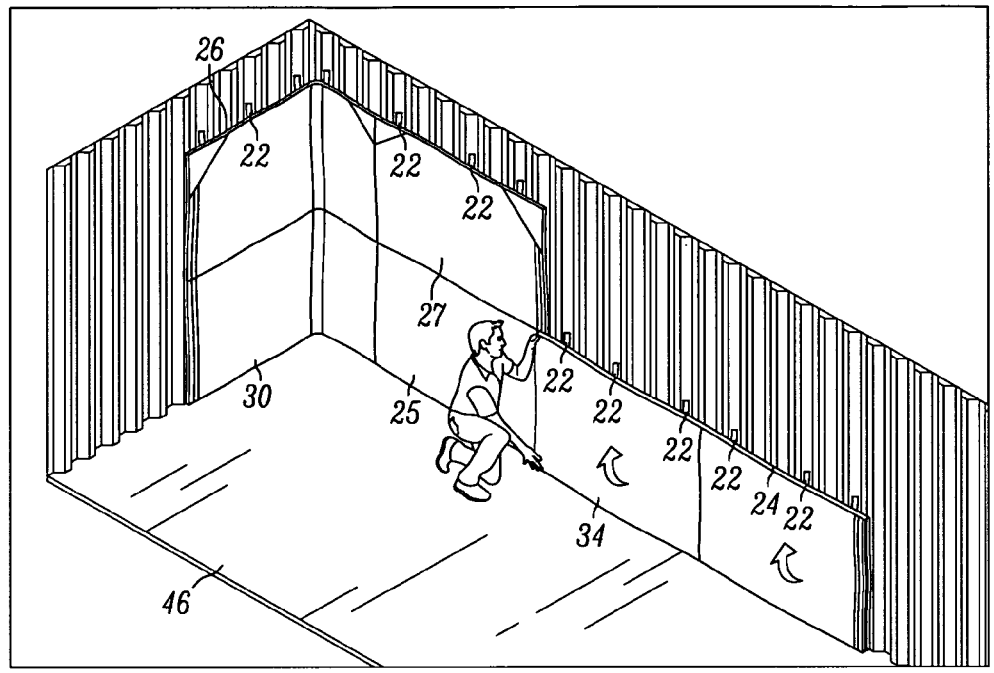
FIGS. 6 and 7 are a continuation of exemplary installing steps following FIG. 5, showing an interconnecting step of connecting a lower section 25 of a first wall panel 30 to a second wall panel 34 adjacent thereto and then connecting an upper section 27 of the first wall panel 30 to the second wall panel 34 (after unfolding second wall panel 34 along the arrows in FIG. 6), in accordance with an embodiment of the invention.

In a preferred embodiment, the appendages 22 along the mid-section 24 and the top-section 26 are color coded with different colors (FIG. 6). For example, a color coded red mid-section 26 and color coded black top-section 26, allows for a quick visual inspection and confirmation of proper installation. In more detail, a horizontal red mid-section 26 indicates proper initial horizontal installation to the installer, along an x-axis 38 and z-axis 39 in FIGS. 3 and 6. The better alignment and installation of the panels 12, the better temperature protection for the cargo, and decrease in drafts or leakage to the cargo. The appendages 22 can be pulled up or lowered for proper coupling to the interior surface 14 of the enclosure 16, and they are visible from a distance, for connection verification and confirmation. A color coded, such as a red, mid-section 24 shows a clear visual horizontal boundary (along x-axis 38 and z-axis 39 in FIG. 3), for good horizontal alignment and installation, and the upwardly facing appendages 22 show good visual connections, comprising indicator flags, to the interior surface 14 of the enclosure 16. For example, if the appendages 22 indicator flags are not visible from a distance, the non-visible appendage may not be properly connected.

Figure 8:
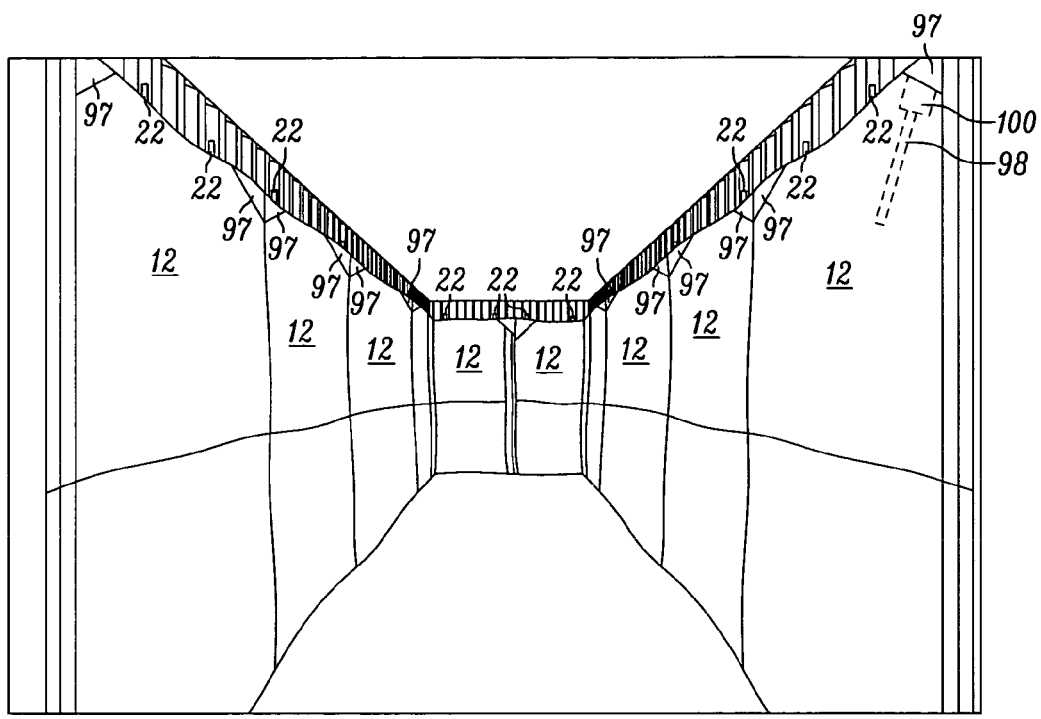
FIGS. 8 and 9 are a continuation of the previous exemplary step in FIG. 7, showing eight wall panels connected to an enclosure, the enclosure shown initially empty and then populated with a cargo, respectively, in accordance with an embodiment of the invention.

In a preferred application, the appendages 22 extend a sufficient length to adhere to and provide a good connection with the interior surface 14 of the enclosure 16, despite the fact that the interior surface 14 may be corrugated. Similarly, it is dimensioned to be visible from a distance providing indicator flags, for simplified visual inspection of proper installation (FIGS. 6 and 8).

In a preferred embodiment, appendages 22 are located strategically a predetermined distance from each adjacent appendage for improved connections to an enclosure. For example, in a metallic or nonmetallic enclosure application, the appendages 22 can be spaced about every sixteen inches. This spacing can provide a good magnetic or Velcro connection. Many nonmetallic enclosures have metallic support structure and/or hold back bars, about every four feet, which would allow the appendages to connect to the support structure.

Figure 19:
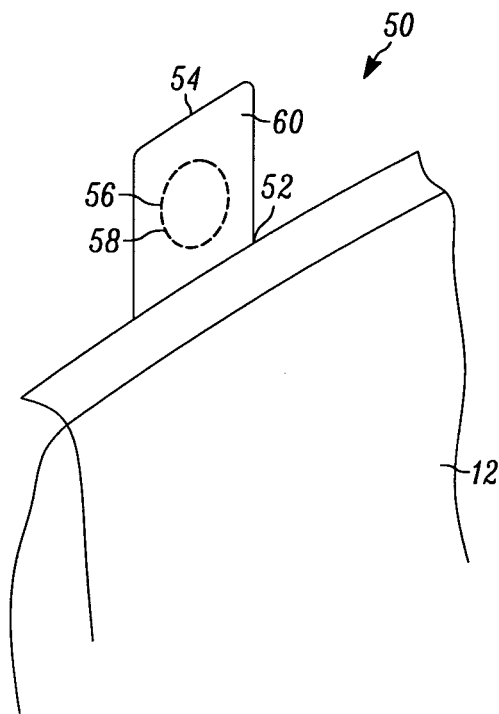
FIG. 19 is a partial perspective view of a wall panel 12, showing one embodiment of an appendage 50 with a proximal section 52 and a distal section 54 including an embedded magnet 56 inside 58, used to connect to a metallic interior surface of an enclosure, in accordance with an embodiment of the invention.

FIG. 19 is a partial perspective view of a wall panel 12, showing one embodiment of an appendage 50 with a proximal section 52 and a distal section 54 including an embedded magnet 56 inside 58, used to connect to a metallic interior surface of an enclosure. The magnet is used to connect to a metallic interior surface 14 and the Velcro can be utilized in other user cases, such as in connection with a non-metallic surfaces.

Figure 20:
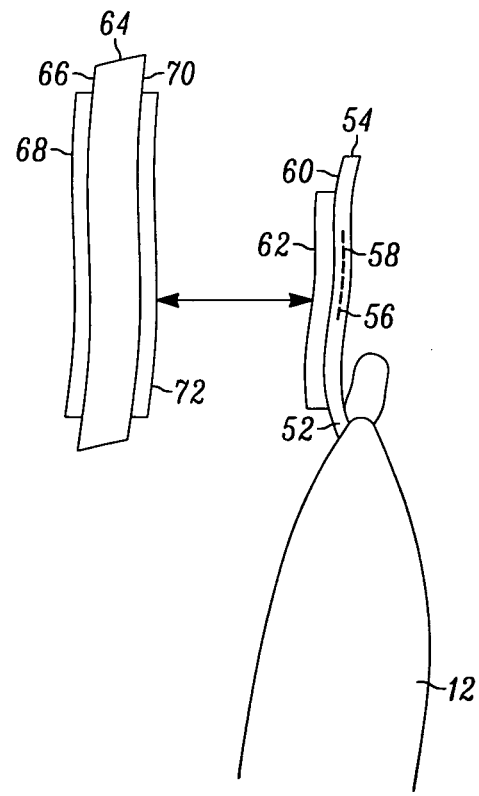
FIG. 20 is a partial perspective view of a wall panel 12, showing one embodiment of an appendage 50 with a proximal section 52 and a distal section 54 including an external surface 60 with Velcro 62 and an anchor 64 with a first side 66 having adhesive tape 68 and a second side 70 with Velcro mate 72, used to connect to a non-metallic interior surface of an enclosure, in accordance with an embodiment of the invention.

FIG. 20 shows an alternative embodiment of an appendage 50 with a proximal section 52 and a distal section 54 including an external surface 60 with Velcro 62 and an anchor 64 with a first side 66 having adhesive tape 68 and a second side 70 with Velcro mate 72, used to connect to a non-metallic interior surface of an enclosure.

Figure 4:
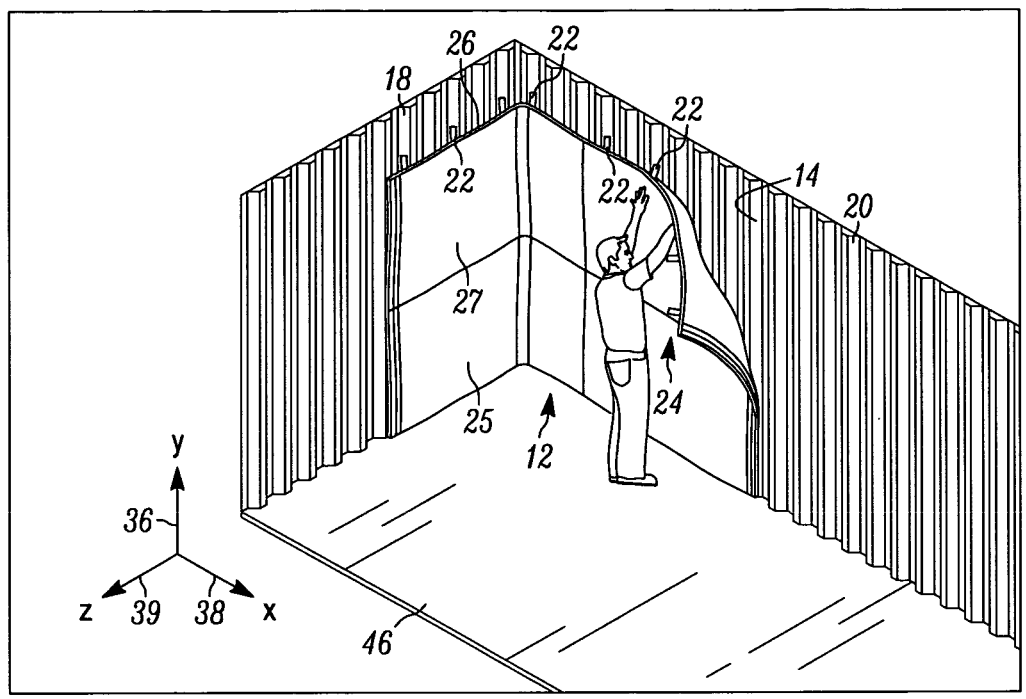
FIG. 4 is a continuation of the exemplary installing step following FIG. 3, showing a wall panel 12 being unfolded generally vertically (along y-axis 36) along a mid-section 24 of the wall panel 12, in accordance with an embodiment of the invention.
Figure 5:
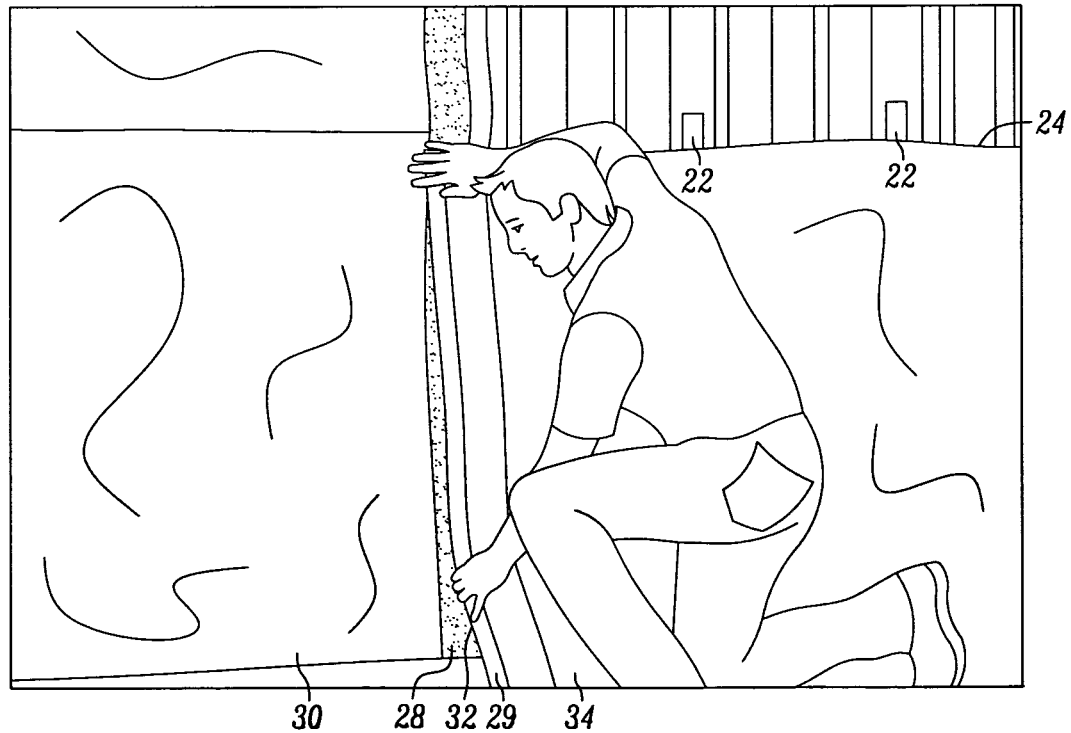
FIG. 5 is a continuation of the exemplary installing step following FIG. 4, showing an interconnecting step of placing, aligning and over-lapping an interface border 32 of a first wall panel 30 adjacent to an interface border 32 of a second wall panel 34 (along a vertical or y-axis 36). The first wall panel 30 is shown being interconnected with the second wall panel 34 via Velcro, for reliable interconnection, aligning and overlapping of adjacent wall panels, in accordance with an embodiment of the invention.

FIG. 5 continues showing the installation following FIGS. 3 and 4. It shows an interconnecting step of placing, aligning and over-lapping an interface border 32 of a first wall panel 30 adjacent to an interface border 32 of a second wall panel 34 (along a vertical or y-axis 36). The first wall panel 30 is shown being interconnected with the second wall panel 34 via Velcro 28, for reliable interconnection, aligning and overlapping of adjacent wall panels. In one embodiment, the interface borders include Velcro on both sides of the wall panel, thereby making each panel universal. Both sides includes an inner facing side and an outer facing side of the wall panel, preferably spaced inwardly from end 29, for enhanced connection and over-lapping.

Figure 7:
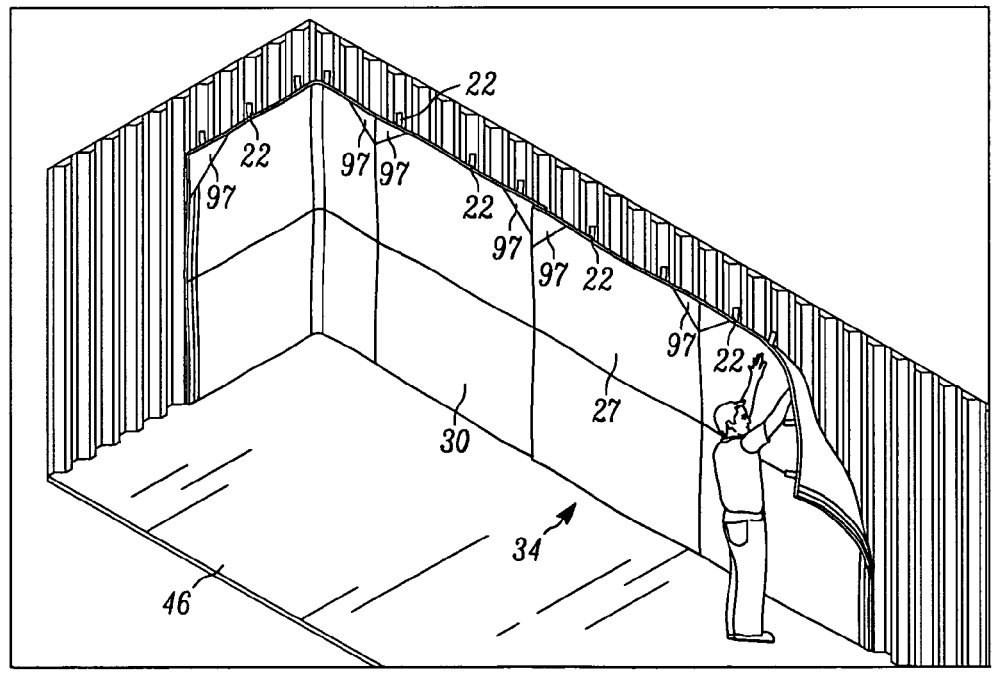

FIGS. 6 and 7 follow the step in FIG. 5. FIG. 6 shows an interconnecting step of connecting a lower section 25 of a first wall panel 30 to a second wall panel 34 adjacent thereto and then connecting an upper section 27 of the first wall panel 30 to the second wall panel 34 (after unfolding second wall panel 34 along the arrows in FIG. 6).

Figure 9:
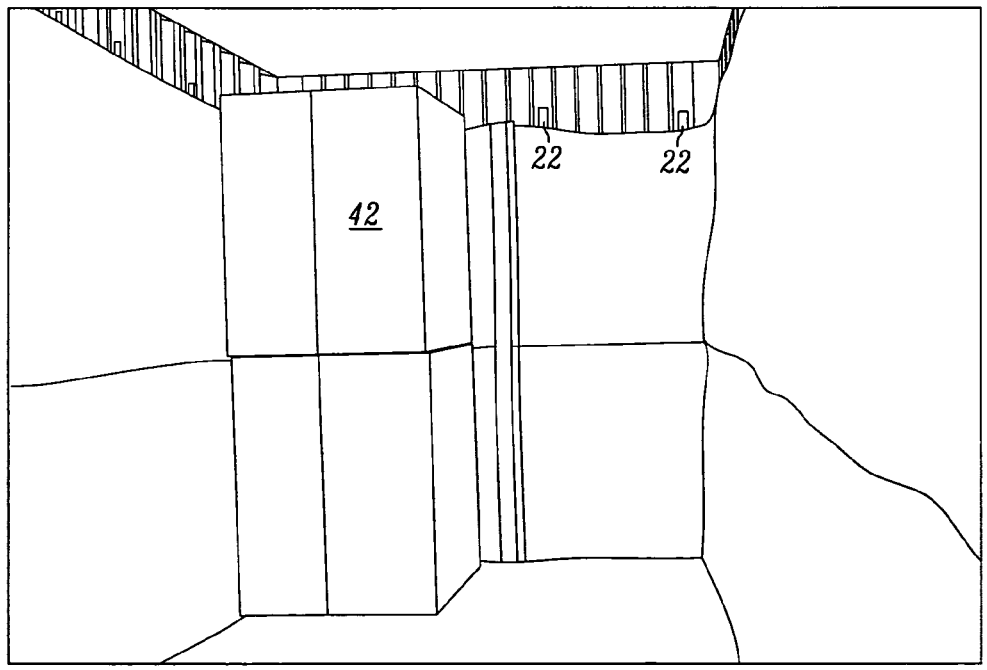

FIGS. 8 and 9 continue the process, by showing eight wall panels connected to an enclosure. The enclosure is shown initially empty in FIG. 8 and then populated with a cargo in FIG. 9. As shown in FIGS. 8 and 9, the plurality of wall panels 12 are installed and interconnected adjacent a nose 18 and walls 20 of the enclosure 16, to provide an enhanced temperature barrier surrounding the sides of a cargo to be protected from extreme temperatures.

In FIG. 8, in a preferred embodiment, corner pockets 97 are provided and are adapted to receive a head 100 of an applicator tool 98, in phantom, for facilitating alignment of a corner portion of a wall panel 12 with respect to the enclosure 16.

Figure 10:
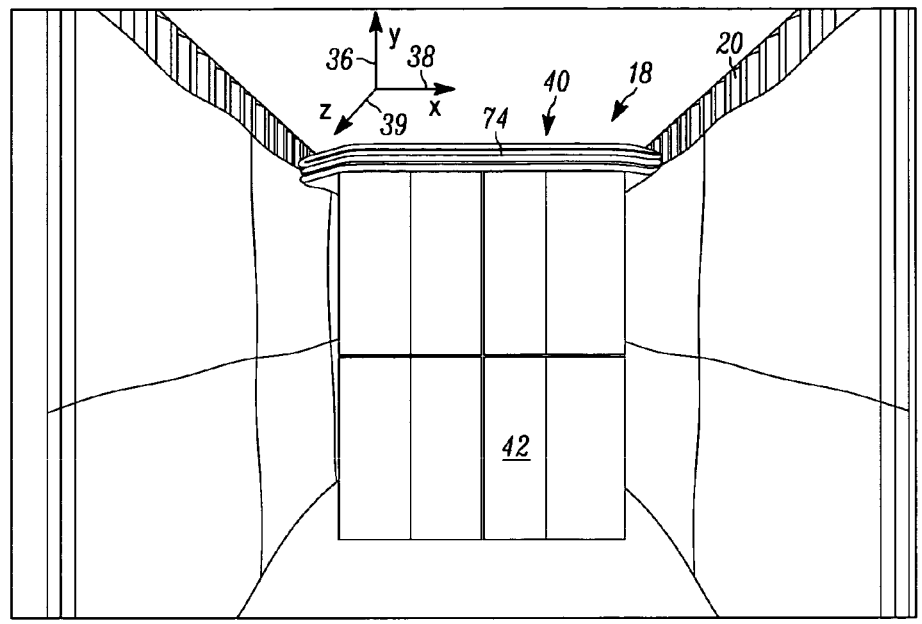
FIG. 10 is a continuation of the previous exemplary step in FIG. 9, showing the enclosure partially populated with a cargo 42, and a ceiling panel 40 placed in a folded position 74, over the cargo 42 to be protected, in accordance with an embodiment of the invention.

Continuing from FIG. 9, FIG. 10 shows the enclosure in proximity to the nose 18, partially populated with a cargo 42, and a ceiling panel 40 placed in a folded position 74, over the cargo 42, in a folded position 74.

Figure 11:
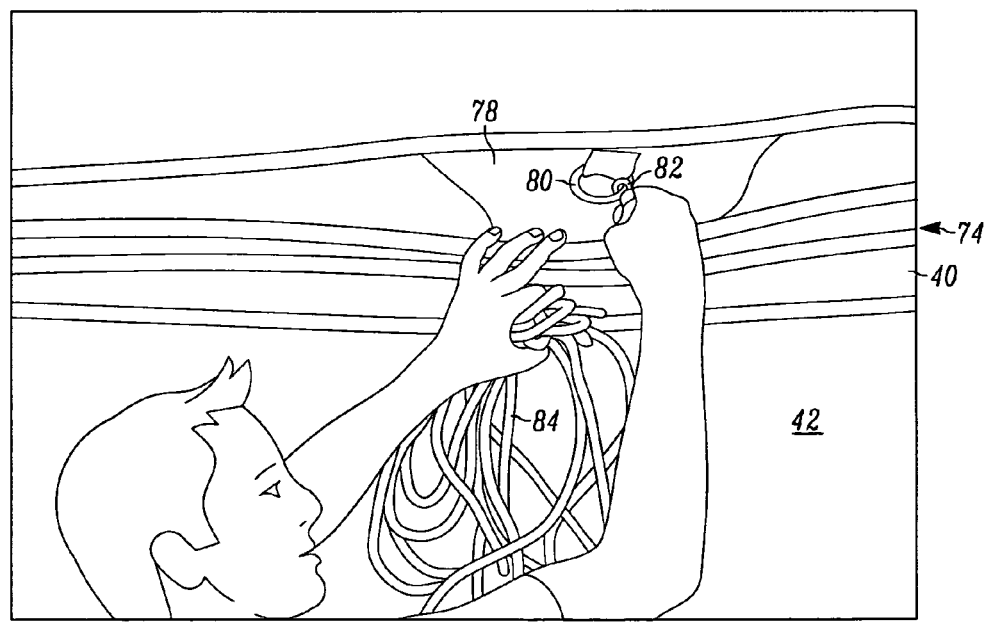
FIG. 11 is a continuation of the previous exemplary step in FIG. 10, with the enclosure partially populated with cargo, showing the ceiling panel 40 placed in a folded position 74, over the cargo 42, with a reinforce area 78 with a ring 80 and a cable 84 for facilitating pulling the ceiling panel 40, after additional cargo is loaded, horizontally (along the z-axis 39 in FIG. 10), to unfold the ceiling panel 40 and cover the cargo 42, in accordance with an embodiment of the invention.

FIG. 11 shows the ceiling panel 40 placed in a folded position 74, over the cargo 42, with a reinforce area 78 facing inwardly toward a center of the enclosure with a ring 80 and a cable 84, for facilitating pulling the ceiling panel 40, after additional cargo is loaded, horizontally (along the z-axis 39 shown in FIG. 10), to unfold the ceiling panel 40 and cover the cargo 42

Figure 12:
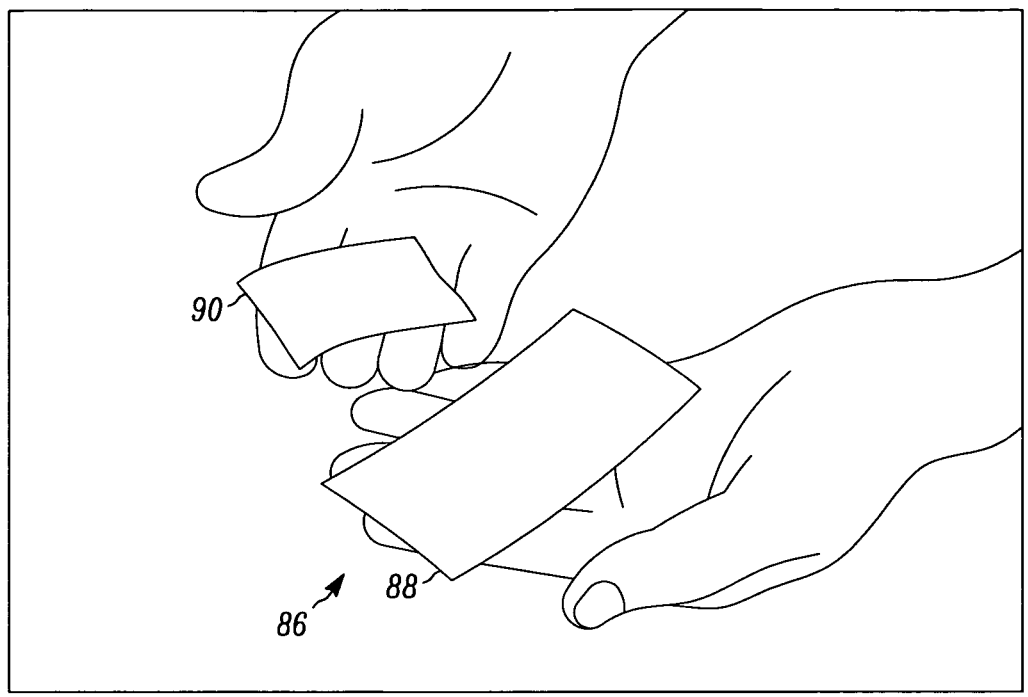
FIG. 12 is partial view of the mosaic panel kit showing a connector 86, disassembled, for connecting and temporarily supporting the cable 84 over the cargo, in accordance with an embodiment of the invention.

FIG. 12 is partial view of the mosaic panel kit showing a connector 86, disassembled, for connecting and temporarily supporting the cable 84 over the cargo, in one embodiment. In more detail, in FIG. 13, the mosaic panel kit can include the connector 86, utilized to temporarily support the cable 84 during additional cargo loading, by supporting the cable 84 and maintaining it out of the way along the z-axis 39 (FIG. 15), so as not to interfere with cargo loading. The connector 86 can further include a first section 88 and a second section 90 comprising a Velcro structure with an adhesive or tape on one side 92 and a second side 94 with Velcro 96, shown interconnected in FIG. 13. An application tool 98 is also shown in FIG. 13, with a flat head 100, an extendable handle 102 and swivel 104, for simplified attachment to an interior surface 14 of the enclosure 16 ceiling.

Figure 13:
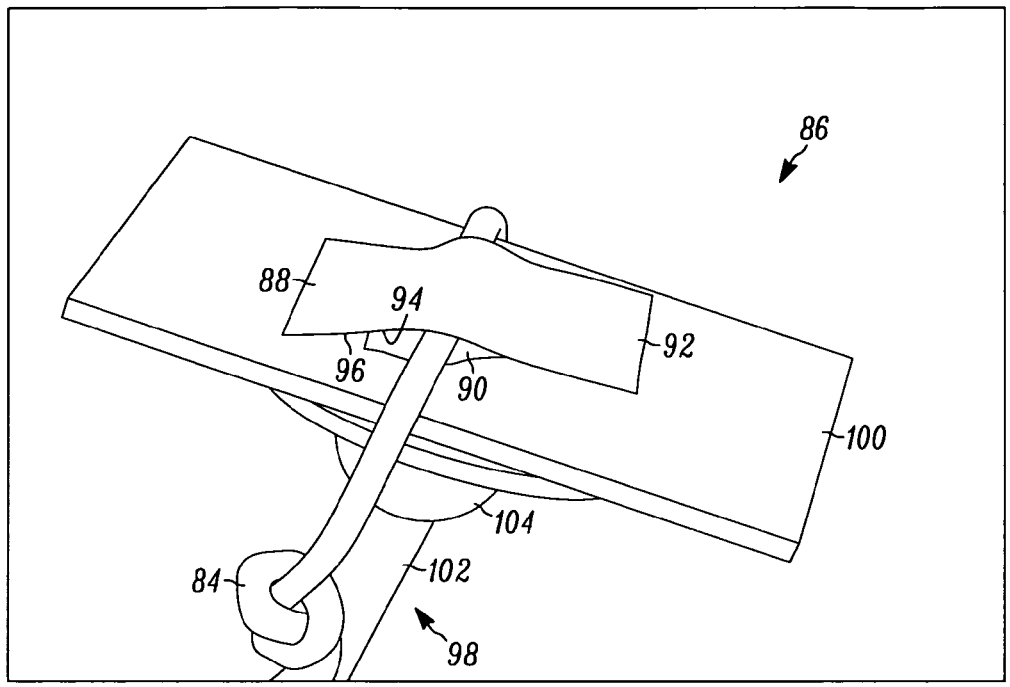
FIG. 13 is partial view of the mosaic panel kit showing the connector 86, utilized to temporarily support the cable 84 during additional cargo loading, by supporting the cable 84 and maintaining it out of the way along the z-axis 39 (FIG. 15), so as not to interfere with cargo loading. The connector 86 is shown with a first section 88 and a second section 90 comprising a Velcro structure with an adhesive or tape on one side 92 and a second side 94 with Velcro 96, shown interconnected. An application tool 98 is also shown, with a flat head 100, an extendable handle 102 and swivel 104, for simplified attachment to an interior surface 14 of the enclosure 16 ceiling, in accordance with an embodiment of the invention.
Figure 14:
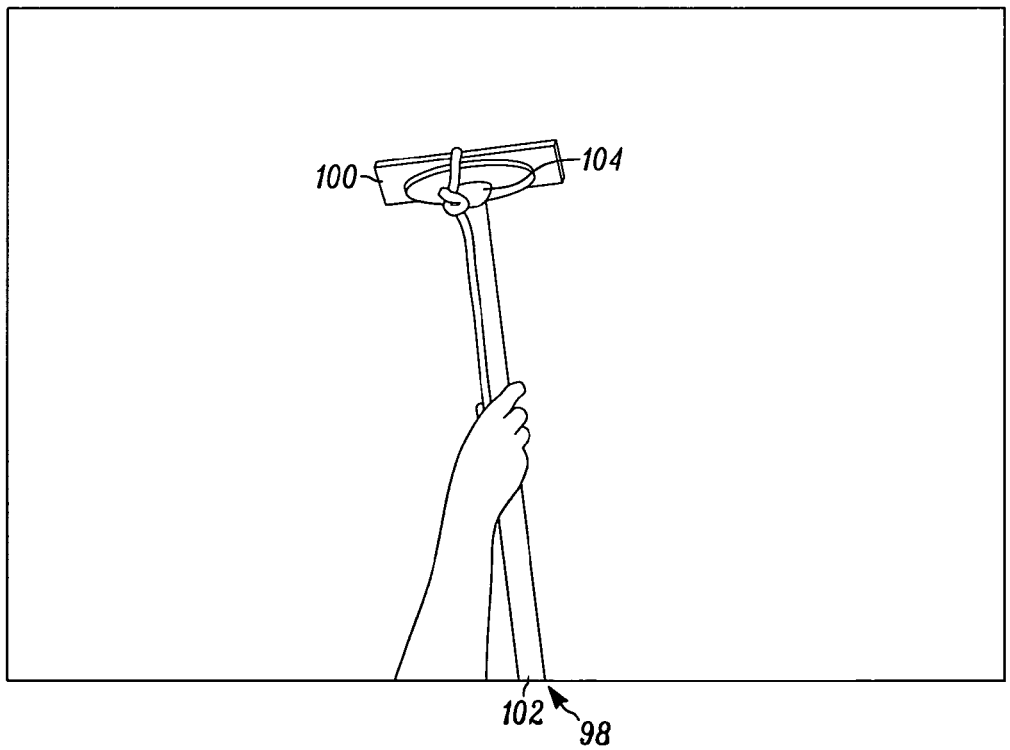
FIG. 14 is partial view of the mosaic panel kit in FIG. 13, showing the application tool 98 with the flat head 100 installing the connector 86 to a ceiling, in accordance with an embodiment of the invention.

FIG. 14 is partial view of the mosaic panel kit in FIG. 13, showing the application tool 98 with the flat head 100 installing the connector 86 to a ceiling of an enclosure, for simplified installation.

Figure 15:
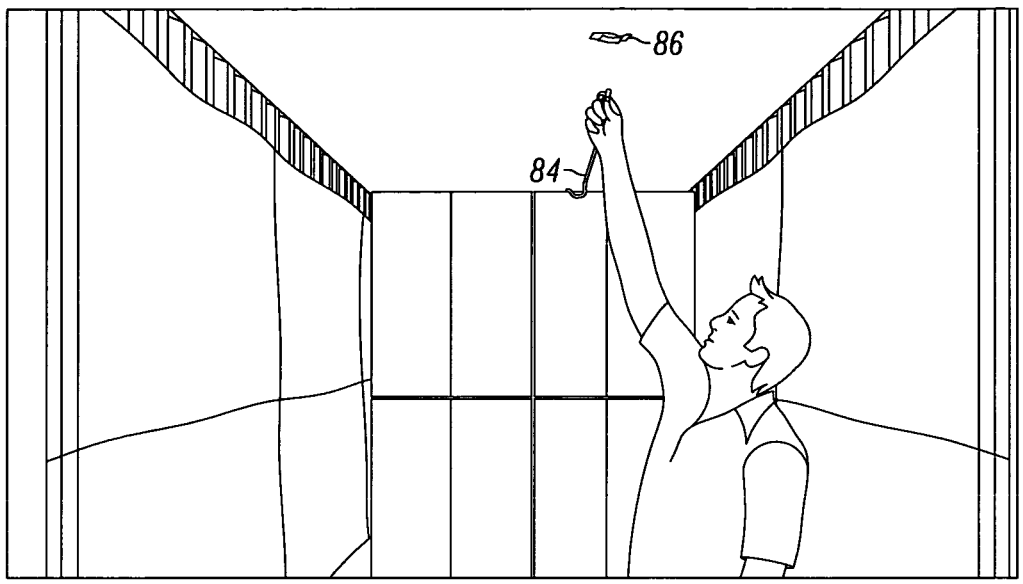
FIG. 15 is partial view of the mosaic panel kit in FIG. 13, showing the connector 86 connected to a ceiling of the enclosure, which had been supporting the cable 84, depicting a connector released condition, and an installer is preparing to pull the cable 84, in accordance with an embodiment of the invention.

FIG. 15 is partial view of the mosaic panel kit, showing the connector 86 connected to a ceiling of the enclosure 16, which had been supporting the cable 84, defining a connector released condition. An installer is preparing to pull the cable 84.

Figure 16:
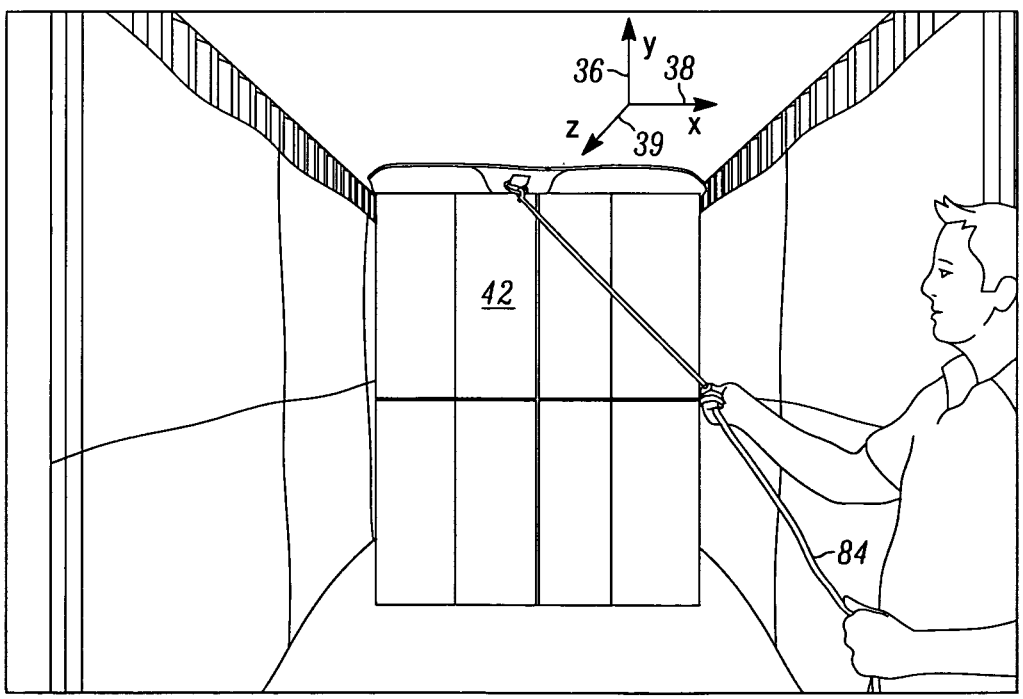
FIG. 16 is partial view of the mosaic panel kit in FIG. 13, showing an installer pulling the cable 84 and ceiling panel 40 over cargo 42, generally along a z-axis, in accordance with an embodiment of the invention.

FIG. 16 is partial view of the mosaic panel kit, showing an installer pulling the cable 84 and ceiling panel 40 over cargo 42, generally along a z-axis.

Figure 17:
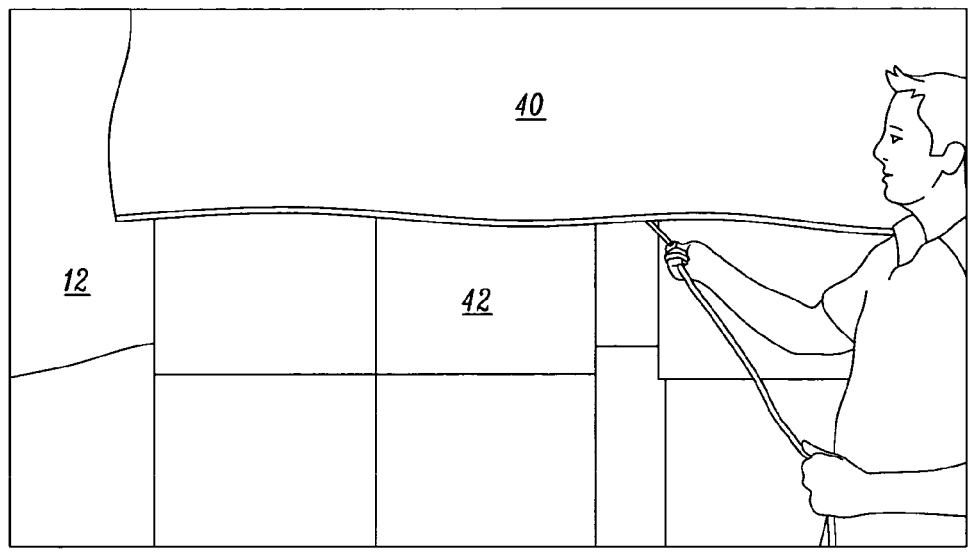
FIGS. 17 and 18 are partial views of an installer continuing to pulling the cable 84 and ceiling panel 40 over cargo 42, extending to cover the sides of the cargo 42 all the way to the floor 46, in accordance with an embodiment of the invention.
Figure 18:
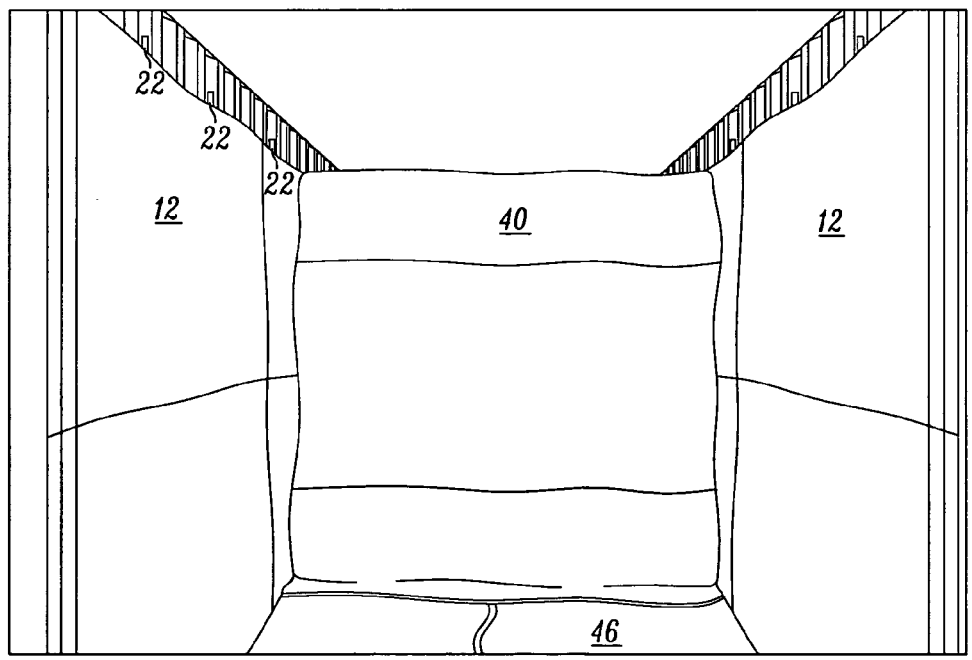

FIGS. 17 and 18 show an installer continuing to pulling the cable 84 and ceiling panel 40 over cargo 42, extending to cover the sides of the cargo 42 all the way to the floor 46.

FIG. 19 is a partial perspective view of a wall panel 12, showing one embodiment of an appendage 50 (also item 22) with a proximal section 52 and a distal section 54 including an embedded magnet 56 inside 58, used to connect to a metallic interior surface of an enclosure, as previously detailed.

Alternative embodiment of an appendage 50 is shown in FIG. 20, with a proximal section 52 and a distal section 54 including an external surface 60 with Velcro 62 and an anchor 64 with a first side 66 having adhesive tape 68 and a second side 70 with Velcro mate 72, used to connect to a non-metallic interior surface of an enclosure.

Figure 21:
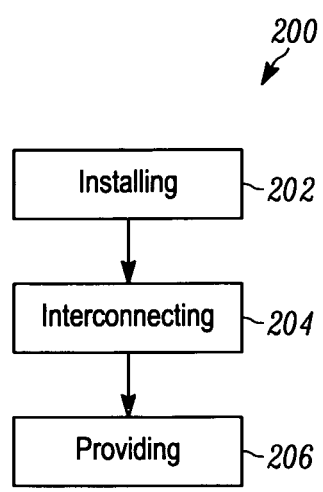
FIG. 21 is block diagram of a mosaic panel method 200 including: installing 202 wall panels 12 to an interior surface 14 of an enclosure 16 nose 18 and walls 20; interconnecting 204 each wall panel 12 with an adjacent wall panel; and providing 206 a ceiling panel 40 over cargo 42 to be protected, in accordance with an embodiment of the invention.

As shown in FIG. 21, a mosaic panel method 200 is shown. The method 200 can include: installing 202 wall panels 12 to an interior surface 14 of an enclosure 16 nose 18 and walls 20; interconnecting 204 each wall panel 12 with an adjacent wall panel; and providing 206 a blanket or ceiling panel 40 over cargo 42 to be protected. The method provides a simple and effective way to enclose temperature sensitive cargo.

The installing step 202 can include: aligning a bottom portion 44 of at least one wall panel 12 with a floor 46 of the enclosure 16; unfolding 48 the wall panel 12 generally horizontally (along an x-axis in FIG. 2); and coupling the wall panel 12 to the interior surface 14 of the enclosure 16.

The installing step 202 shown in FIG. 3, can also include providing strategically placed appendages 22 along a mid-section 24 of each wall panel 12, configured to simplify coupling to the interior surface 14 of the enclosure 16. As previously detailed, enclosure 16 or container walls 20, are traditionally corrugated. The appendages 22 can provide enhanced connections to the interior surface 14 of enclosure 16, to hold and secure the desired area along the walls 20.

The installing step 202 shown in FIG. 3, can also include providing and identifying at least one of a mid-section 24 of each wall panel 12 and appendages 22 along the mid-section 24 of each wall panel 12, by color coding. For example, as detailed previously, red can indicate proper installation to the installer. Red appendages 22 can be pulled up for proper coupling to the interior surface 14 of the enclosure 16. When properly installed, the mid-section 24 in FIG. 3, shows a clear visual horizontal boundary or border, indicating proper horizontal installation and alignment with the floor 46 and interior surface 14, for minimal leakage and enhanced insulation.

After partial installation in FIGS. 3 and 4, the installing step 202 further includes unfolding the wall panel 12 generally vertically along a mid-section 24 of the wall panel 12, such that a lower section 25 and upper section 27 are connected to the interior surface 14 of the enclosure (see arrows in FIG. 3).

As previously detailed, the installing step 202 includes providing strategically placed appendages 22 along a top-section 26 of each wall panel 12, for secure connection to the enclosure 16 in proximity to an upper portion of the nose 18 and walls 20. This step and structure is configured to facilitate and simplify the coupling of the top-section 26 of each wall panel 12 to the interior surface 14 of the enclosure 16, generally in proximity to the ceiling (FIGS. 6 and 7).

As previously detailed, the installing step 202 can include identifying at least one of a top-section 26 of each wall panel 12 and appendages 22 along the top-section 26 of each wall panel 12, by color coding. For example, black could indicate proper installation to the installer. Color coded appendage 22 can be pulled up along the y-axis 36, for proper coupling to the interior surface 14 of the enclosure 16. A color coded top-section 26 can provide a clear visual horizontal boundary, for good installation and color coded appendage 22 can provide upwardly extending indicator flags, for showing good visual connection to the interior 14 of the enclosure 16 near the ceiling or upper portion of the nose 18 and walls 20, as shown in FIG. 9, for example. Thus, in a preferred embodiment, the installing step 202 can include identifying at least one of a top-section 26 of each wall panel 12 and appendages 22 along a top-section 26 of each wall panel 12, by color coding.

Referring to FIG. 5, the interconnecting step 204 can include placing, aligning and over-lapping an interface border 32 of a first wall panel 30 adjacent to an interface border 32 of a second wall panel 34 (along a vertical or y-axis 36) during this step. Next, the first wall panel 30 is interconnected with the second wall panel 34 via Velcro, for simplified interconnection, aligning and overlapping of adjacent wall panels.

The interconnecting step 204 can include placing an interface border 32 comprising Velcro on both sides (side facing interior surface of enclosure and side facing cargo) of the wall panels 12, for advantageously, providing a universal wall panel. The interconnecting step 204 can also include placing an interface border 28 located in proximity of an end portion 29 of the wall panels 12, configured to provide an overlapping connection and enhanced temperature seal in proximity to the end portions 29 along a y-axis 36. Advantageously, minimal leakage between adjacent wall panels can provide improved protection for temperature sensitive cargo. In a preferred embodiment, the interface border 28 I spaced and located inwardly from the end portion 29, for enhanced over-lapping and minimal leakage.

As detailed with respect to FIG. 5, the interconnecting step 204 can include connecting a lower section 25 of a first wall panel 30 to a second wall panel 34 adjacent thereto and then connecting an upper section 27 of the first wall panel 30 to the second wall panel 34. This step can provide simplified alignment by connecting the lower sections 25 of adjacent panels first, because the second wall panel 34 is being substantially supported by floor and can be easily aligned and adjusted for proper alignment and interconnection.

As seen in the figures, the wall panels 12 are portable, foldable and light weight for simplified installation and removal, and they provide a desired insulation value to help protect temperature sensitive cargo. The panels 12 and 40 can be easily transported to or from a job site, in many ways, such as by pallet (FIG. 1), in plastic wrap, and the like.

As shown in FIGS. 10-17, the providing step 206 includes placing the ceiling panel 40 over the cargo, to provide an improved upper temperature protection barrier.

In FIG. 10, the providing step 206 includes: placing the ceiling panel 40 in a folded position 74, over some of the cargo to be protected; and pulling an upper portion of the ceiling panel horizontally along a z-axis 39 along the length of the enclosure 16, to unfold the ceiling panel 40 and cover more of the cargo to be protected, as shown in FIGS. 16-18.

As should be understood by those skilled in the art, the construction of the wall panels 12 and ceiling panel 40 can vary based on the application. For example, the wall panels 12 and ceiling panel 40 herein can be made of various materials to provide desired insulation properties and values. In one embodiment, the wall and ceiling panels 12 and 40 include at least three layers of Typar, an insulating fiber and Typar. The fiber is typically one, two or three inches thick again depending on the application and desired insulating characteristics. Likewise the dimensions can vary widely. In one embodiment, the wall panel is about four feet by eight feet for simplified handling and installation. And, the number of panels used is dependent on various factors, such as the volume of the enclosure and/or volume of the cargo or material.

Advantageously, the method 200 and mosaic panel kit 10, can provide the following benefits: particularly adapted and configured for use in the transportation industry, such as for use with containers, trailers, domestic or international shipments, rail cars and shipping applications, accordion configuration for portability, simplified installation and simplified transportation to job sites, accommodates entire load coverage, partial load coverage and mixed load coverage, simplified and efficient installation and removal and light weight and flexibility.

Further, the method 200 and mosaic panel kit 10, can provide improved insulating properties, such as multi-layered protection of temperature sensitive cargo, and improvements in connection with conduction, convection, moisture, and extreme temperatures, such as heat and freezing.

As should be understood, the matter set forth in the foregoing description and accompanying drawings is offered by way of illustration only and not by limitation. While particular embodiments have been shown and described, it will be apparent to those skilled in the art that changes and modifications may be made without departing from the broader aspects of Applicant's invention.

What is claimed is:

1. A mosaic panel method comprising:
   installing wall panels to an interior surface of an enclosure nose and walls, by:
   aligning a bottom portion of at least one wall panel with a floor of the enclosure;
   unfolding the wall panel generally horizontally; and
   coupling the wall panel to the interior of the enclosure;
   interconnecting each wall panel with an adjacent wall panel; and
   providing a blanket panel over cargo to be protected.

2. The method of claim 1, wherein the installing step includes providing strategically placed appendages along a mid-section of each wall panel, configured to simplify coupling to the interior surface of the enclosure.

3. The method of claim 1, wherein the installing step includes identifying at least one of a mid-section of each wall panel and appendages along a mid-section of each wall panel, by color coding.

4. A mosaic panel method comprising:
   installing wall panels to an interior surface of an enclosure nose and walls, by: unfolding the wall panel generally vertically along a mid-section of the wall panel;
   interconnecting each wall panel with an adjacent wall panel; and
   providing a blanket panel over cargo to be protected.

5. The method of claim 4, wherein the installing step includes providing strategically placed appendages along a top-section of each wall panel.

6. The method of claim 4, wherein the installing step includes locating and spacing each appendage along each wall panel at about sixteen inches from an adjacent appendage, for consistent coupling to the interior surface of the enclosure.

7. The method of claim 4, wherein the installing step includes identifying at least one of a top-section of each wall panel and appendages along a top-section of each wall panel, by color coding.

8. The method of claim 4, wherein the interconnecting step includes placing, aligning and over-lapping an interface border of a first wall panel adjacent to an interface border of a second wall panel.

9. The method of claim 4, wherein the interconnecting step includes placing, aligning and over-lapping an interface border of a first wall panel adjacent to an interface border of a second wall panel along a vertical axis when installed, and interconnecting the first wall panel with the second via a hook and loop fastener.

10. The method of claim 4, wherein the interconnecting step includes placing an interface border comprising a hook and loop fastener on both sides of the wall panels.

11. The method of claim 4, wherein the interconnecting step includes placing an interface border located in proximity of an end portion of the wall panels, configured to provide an over-lapping connection and temperature barrier.

12. The method of claim 4, wherein the interconnecting step includes connecting a lower portion of a first wall panel to a second wall panel adjacent thereto and then connecting an upper portion of the first wall panel to the second wall panel.

13. The method of claim 4, wherein the interconnecting step includes connecting a lower portion of a first wall panel to a second wall panel adjacent thereto and then connecting an upper portion of a first wall panel to the second wall panel, by unfolding the upper portion from the lower portion.

14. The method of claim 4, wherein the installing step includes providing wall panels that are portable, foldable, light weight and provide a desired insulation value.

15. The method of claim 4, wherein the providing step includes placing the blanket over the cargo, to provide an upper temperature barrier.

16. The method of claim 4, wherein the providing step includes: placing the blanket in a folded position, over some of the cargo to be protected; and pulling an upper portion of the blanket horizontally to unfold the blanket and cover more of the cargo to be protected.

17. The method of claim 16, wherein the providing step includes locating a ring under a top panel of the blanket 1 and a cable for guiding the blanket over cargo during unfolding, whereby a simulated rail is formed minimizing the possibility of the cable being undesirably snagged to the cargo.

18. The method of claim 4, wherein the providing step includes: placing the blanket 1 in a folded position, over some of the cargo to be protected; and pulling an upper portion of the blanket horizontally to unfold the blanket and cover more of the cargo to be protected, by providing a ring, a cable and cable support, for facilitating pulling and unfolding the ceiling panel once additional cargo in loaded and requires covering.

19. A mosaic panel kit, comprising:
    wall panels configured to be installed to an interior surface of an enclosure nose and walls;
    a plurality of appendages spaced along a mid-section and a top-section of each wall panel configured to adhere to the interior surface of the enclosure;
    interface borders, for interconnecting and over-lapping a first wall panel adjacent to an interface border of a second wall panel along a vertical axis; and
    a ceiling panel for blanketing cargo to be protected.

20. The kit of claim 19, wherein the wall panels are configured for ease of installation, to be: aligned at a bottom portion with a floor of the enclosure; unfolded generally in an accordion like manner generally horizontally; and coupled and adhered to the interior of the enclosure via the plurality of appendages.

21. The kit of claim 19, wherein the appendages provide adherence to the enclosure along a mid-section and top-section of each wall panel.

22. The kit of claim 19, wherein the appendages along the mid-section and the top-section are color coded with different colors.

23. The kit of claim 19, wherein the appendages extend a sufficient length to adhere to the enclosure and be visible from a distance.

24. The kit of claim 19, wherein the appendages include a proximal section and a distal section including at least one of a magnet and a hook and loop fastener.

25. The kit of claim 19, wherein the interface border includes a hook and loop fastener on both sides of the wall panels.

26. The kit of claim 19, wherein a plurality of wall panels are installed and interconnected adjacent a nose and walls of the enclosure.

27. The kit of claim 19, wherein the ceiling panel is configured to be positioned over some of the cargo to be protected in proximity to the nose, in a folded position; and pulled horizontally to unfold the ceiling panel and cover more of the cargo to be protected.

28. The kit of claim 19, wherein the ceiling panel includes a ring configured to receive a hook and cable for pulling the ceiling panel over additional cargo.

29. The kit of claim 28, further comprising a connector for supporting the cable.

* * * * *